United States Patent

[11] 3,585,311

[72] Inventors David A. Berkley
Red Bank;
Olga M. M. Mitchell, Summit, both of, N.J.

[21] Appl. No. 854,457
[22] Filed Sept. 2, 1969
[45] Patented June 15, 1971
[73] Assignee Bell Telephone Laboratories, Incorporated
Murray Hill, N.J.

[54] SPEECH PROCESSOR USING CONTIGUOUS MULTIBAND CENTER-CLIPPING
15 Claims, 8 Drawing Figs.

[52] U.S. Cl. .......... 179/170.2, 179/1 HF, 325/65

[51] Int. Cl. .......... H04m 9/08

[50] Field of Search .......... 179/1 HF, 170.2, 170.4, 170.6, 170.8, 15.55, 1 P; 325/52, 65

[56] References Cited

UNITED STATES PATENTS 2,736,771 2/1956 Hanson et al. .......... 179/1 HF

*Primary Examiner*—Kathleen H. Claffy
*Assistant Examiner*—David L. Stewart
*Attorneys*—R. J. Guenther and Edwin B. Cave

ABSTRACT: The effect of circuit echo and long-time room reverberation in telephonic links are reduced by contiguous band filtering of the signal followed by center clipping of the filter outputs. Distortion products of the clippers are removed in a second filtering stage. A two-thirds octave filter passband width is advantageous.

INVENTORS
D. A. BERKLEY
O. M. M. MITCHELL
BY Charles E. Graves
ATTORNEY

SPEECH PROCESSOR USING CONTIGUOUS MULTIBAND CENTER-CLIPPING

FIELD OF THE INVENTION

A familiar class of problems in voice telephony generally involves the unwanted recurrence of a desired signal following its generation. Depending on which part of the telephone system is being considered, the specific problem has unique aspects along with ones common to the class.

BACKGROUND OF THE INVENTION

For example, in hands-free telephony and occasionally also in some loops having handsets, one problem encountered of this class is room reverberation. A speech signal originated in a reverberative enclosure such as a metal-walled office, reaches a listener cloaked in its own repetitions. The reverberative signals if of short duration produce coloration which normally does not affect intelligibility. Their presence, however, can still be annoying to the average listener at the other end of the circuit.

Long-time reverberation on the other hand causes the speech to have "reverberant tails" that are long enough in time to become superimposed onto later-occurring speech signals as well as into time slots containing no speech. The result is a significantly reduced level of intelligibility.

A further and increasingly critical signal recurrence problem is circuit echo. This is a talker's signal returning to his ear from an impedance mismatch somewhere in the connection path between telephones. More particularly, it often stems from poor return loss at hybrid circuits in the transmission path. To the user, echo of this sort is usually not apparent if the circuit, and thus also the round-trip delay, is short. In such cases, if the echo power is weak relative to the listener's sidetone level, the two will usually mingle with no disadvantage. But as the delay increases, the echo is heard increasingly distinct from the sidetone. The effect on a listener of hearing his speech repeated momentarily after its utterance is, if loud enough, often so disturbing as to interrupt his very speech processes.

Delay is minimized as one advantage of modern open air repeatered microwave carrier systems. Even with the speed of propagation of electromagnetic energy in free space, however, as transmission distance increases a critical round-trip delay length is inevitably encountered. For two-way telephony, the synchronous satellite link is an example of one which falls within the critical period, with round-trip delay on the order of 0.6 seconds.

Echo suppressors are accordingly inserted in telephone transmission paths where echo is likely to occur. These circuits recognize the presence of speech propagating in one direction in the path and in the response thereto insert a large loss in the opposite direction, i.e., that in which the echo will return. With present suppressors, however, two parties talking at once through their common telephone connection can with some equipment cause the condition of lockout in which transmission in both directions is squelched for the duration. Even where lockout is obviated, there still is the problem of speech mutilation caused by insertion of 6 db. attenuation during the double-talking condition. In a very long loop this can be quite disturbing to a listener.

The present invention is concerned principally with reducing the effects in telephony of the unwanted recurrence of a desired signal; and this is the main inventive object.

Other important inventive objects are:

to reduce speech echo on long telephonic links without necessarily reducing received speech volume, to reduce the effects on speech intelligibility of room reverberation, to achieve the foregoing objects within a channels bandwidth of about 3000 Hz. while maintaining acceptable speech quality.

SUMMARY OF THE INVENTION

In its broad aspect, the present invention contemplates dividing the bandwidth of a voice frequency channel into several contiguous subbands using a first bank of band-pass filters, followed by center clipping each passband, removing clipping distortion in a second filter bank, and combining of the second filter bank output into an output signal to be transmitted.

The resultant signal has been found to exhibit several interesting aspects. If the input signal is moderately reverberant speech, the long-time reverberation energy is markedly reduced, but—somewhat s surprisingly—without impairing intelligibility. If the input signal contains a low energy echo component, this too is reduced without degrading the intelligibility of a desired signal proceeding in the same direction.

In one inventive embodiment, fixed clipping levels are used which in effect close down each passband 50 percent to 70 percent of the time while passing the main information-bearing signal lobes the remainder of the time. Parameter-responsive clipping levels are also readily envisionable.

The odd-harmonic distortion generally caused by center clippers, which in turn generates intermodulation products if two sinusoids are present in the same passband, is substantially eliminated by a selection, wherever permitted by the usual telephone band limits, of two-thirds octave as the passband width.

The invention in all embodiments has the further inherent advantage of removing background noise below the clipping level, as well as reverberant speech energy.

The invention and its further objects, features, and advantages will be readily discerned in detail from the description of illustrative embodiments which follow.

THE DRAWING

ILLUSTRATIVE EMBODIMENTS

Figure 1A:
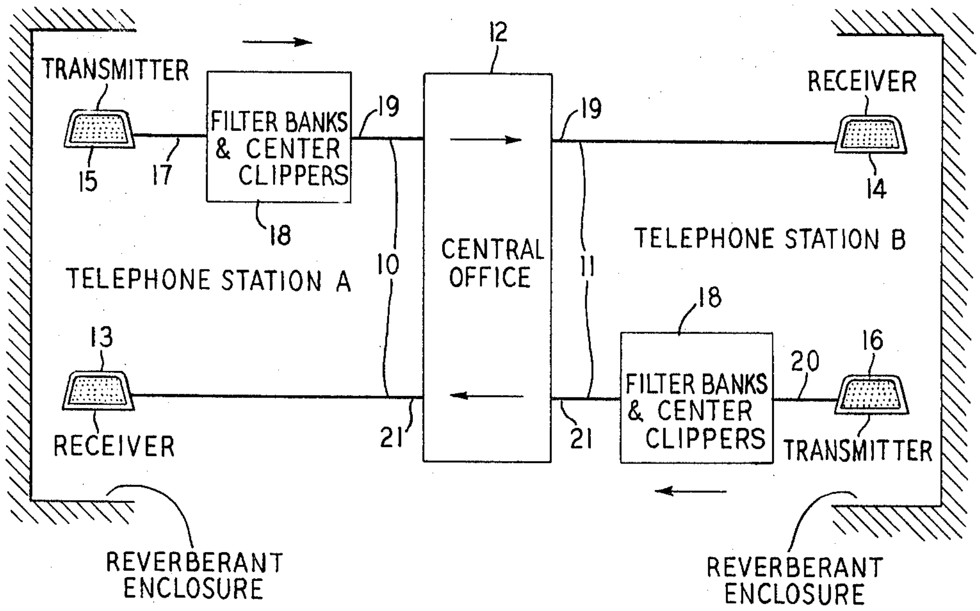
FIG. 1A is a schematic block diagram of a hands-free telephone link embracing the invention.

FIG. 1A depicts the invention as used in the reduction of room reverberation. Two telephone stations, denoted A and B, are connected by lines 10, 11 respectively to a common central office 12. Stations A and B are of the "hands-free" type in which the receivers 13, 14 are loudspeakers. The transmitters 15, 16 in such a system are typically of the type which—unlike the carbon transistor—are not inherently suppressors of background noise. Stations A and B also include where appropriate the usual components such as dial, ringer, switchhook, antisidetone network, etc. These are not shown, since aside from the manner of interconnecting these with the present invention (which will vary in accordance with the station set specification), the reverberation-reducing circuit is independent of such components. Likewise, the item 12 termed a central office also signifies all possible links and modes of interconnection between the stations A and B.

The transmission path from station A to station B is symbolized by the connections including line 17, circuit 18, and line 19. Similarly, the transmission path from station B to station A is symbolized by the connections including line 20, a second circuit 18, and line 21. Such paths will normally be two-wire to central office 12, but can, of course, include four-wire transmission if more than one office is involved.

REVERBERATION REDUCTION

Figure 1B:
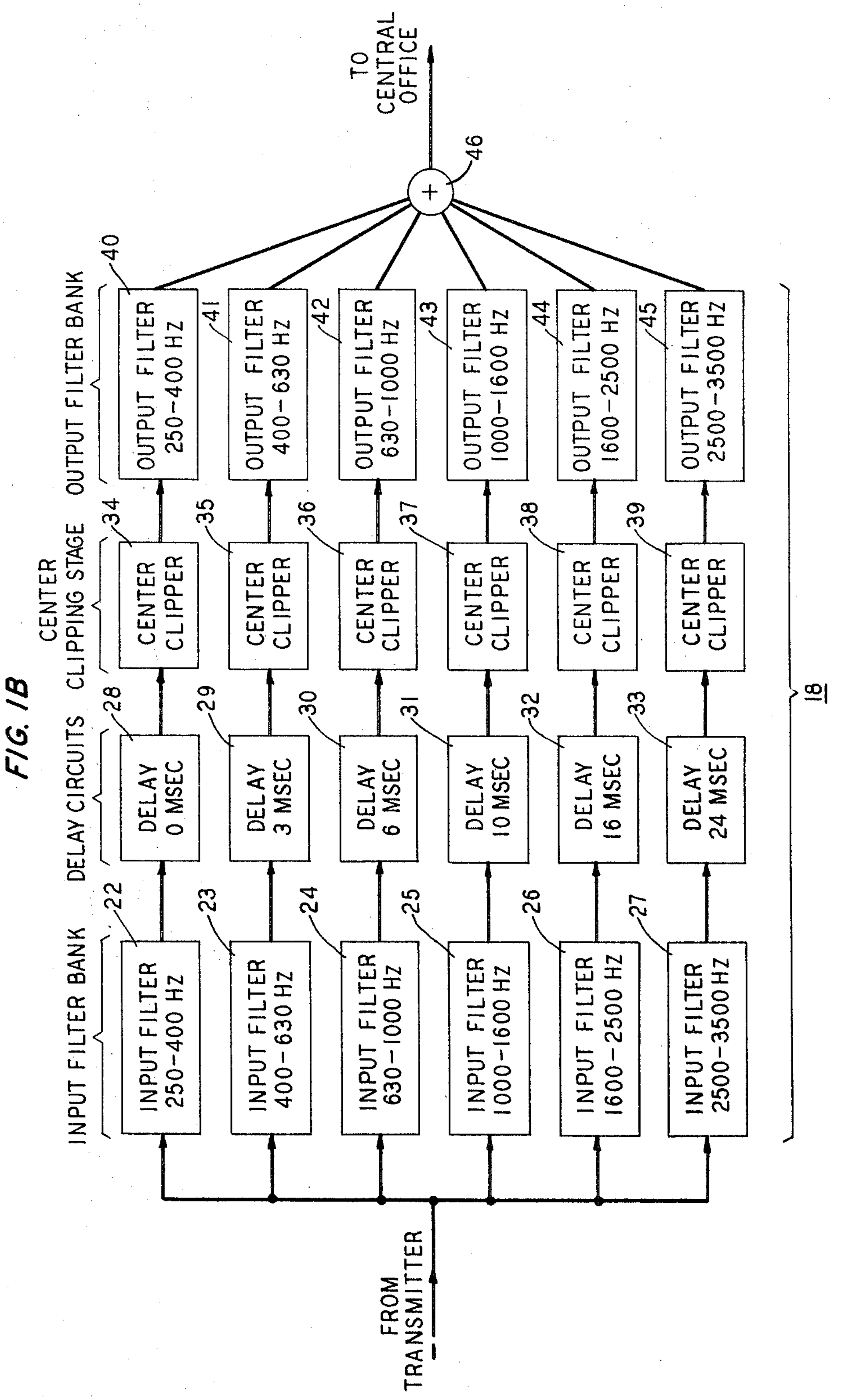
FIG. 1B is a block diagram of the inventive speech processor.

The circuits 18 are advantageously identical; and accordingly like numerals are used in their description. As shown in FIG. 1B, each circuit 18 comprises an input filter bank having input filters 22—27. The passbands of filters 22—27 are contiguous, and in the instant embodiment cover the frequency spectrum between 250 Hz. and 3500 Hz. This bandwidth is the typical unmodulated telephone channel bandwidth and embraces a very large percent of speech power typically generated. The power is not, however, uniformly distributed in the passbands of the input filters 22—27.

The outputs, in the frequency domain, of the input filters 22—27 typically include a familiar ringing component. Also, because of their differing frequency range, the filters impart differing delays to their respective inputs. Such delays are compensated for by delay circuits 28—33 which, for example, are adjusted to cause the impulse response maxima of all the filters to occur simultaneously. Typical delays, in milliseconds, for the circuits 28—33 chosen to adjust the particular passbands used, are shown in FIG. 1B. One of the delays is set equal to zero as the reference delay.

The outputs of the respective input filters 22—27, which represent the chosen spectral components of input speech, thus arrive concurrently at the inputs to center clippers 34—39. These, in effect, block the further transmission of any amplitude value falling below a selected absolute value. By choosing the clipping level to embrace the probable maximum peak amplitude values of the reverberant components of the signal, the latter are effectively eliminated.

Figure 2:
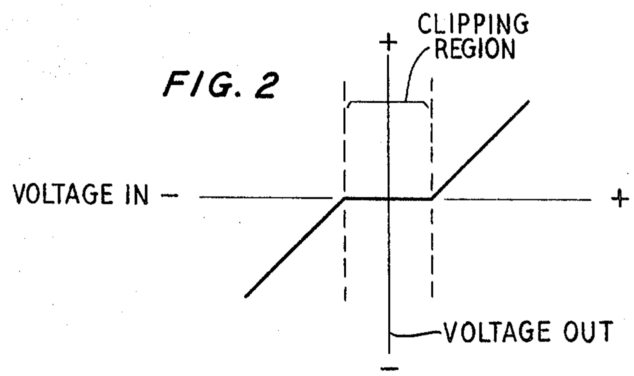
FIGS. 2 through 6 are waveform diagrams demonstrating certain aspects of the invention.
Figure 3:
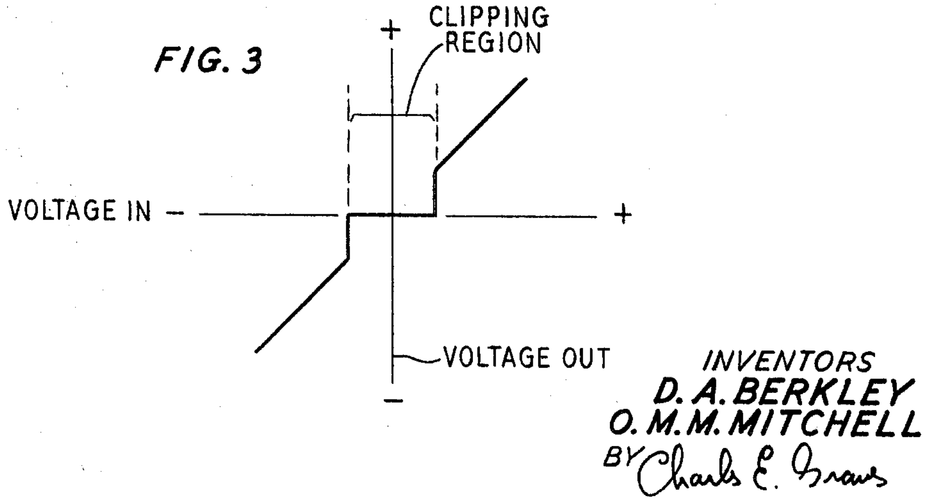

Two examples of the center-clipper transfer function are shown in FIGS. 2 and 3. The clipping level depicted in FIG. 2 has the effect of reducing the amplitude of signals passed through as well as blocking signals falling below the clipping level. In FIG. 3, the clipping region is the same as in FIG. 2, but unclipped signals are not attenuated.

The functioning of center clippers 34—39 are frequency independent; but in setting the several clipping levels, account is taken of the fact that the energy density distribution of reverberant sound typically varies across the frequency spectrum. Excessive clipping levels which would pointlessly block parts of the desired signal, and unduly low levels which would pass reverberant sound peaks thus are to be avoided.

It has been found experimentally that most reverberant energy is eliminated when the clipping level is set for each clipper at one-tenth of the anticipated average peak amplitude in that band. Resulting speech quality is almost undegraded and intelligibility appears not to be impaired. Each band is clipped a fixed fraction of the time which can be in the range of 50 percent to 70 percent of the time.

Stated another way, with respect to peak signal at the input to the first filter bank integrated over the speech spectrum, the clipping levels in the clippers 34—39 are advantageously set at −20 db., −25 db., −31 db., −33 db., −35 db. −37 db. respectively.

Following center clipping, the signals in the several subbands are again filtered, in filters 40—45, to remove those distortion products generated in center clippers 34—39 which fall outside of the respective passband. The filters 40—45 advantageously have passbands identical to their counterpart input filters 22—27 since at the output filter point any frequencies which fall outside the range of the particular subband contain no useful information in any event. However, under some conditions of significant filter ringing, an output filter advantageously is wider than its corresponding input filter; and in fact may have as its input more than one center-clipper output.

The outputs of each of the filters 40—45 now are combined in summing junction 46, which allows each filter 40—45 to look into the proper output impedance. In the case of station A, the output of the summing junction 46 is connected to line 19 for station B, the output of junction 46 is connected to line 21.

In the embodiment of FIG. 1B, the passbands of filters 22—26 are two-thirds octave wide while filter 27 is one-half octave wide. A total of six subbands to be independently center clipped is thus afforded. In general, better speech quality results from the more such subbands used. An upper limit is imposed, however, by the ringing problem. Ringing, being proportional to the filter bandwidth reciprocal, is aggravated as the passband is narrowed. Harmonic distortion, however, does not impose a limit on the number of subbands.

Figure 5:
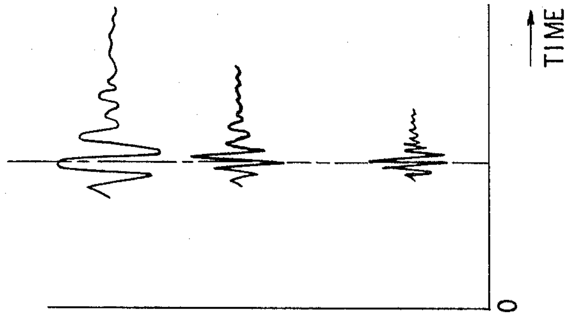
Figure 4:
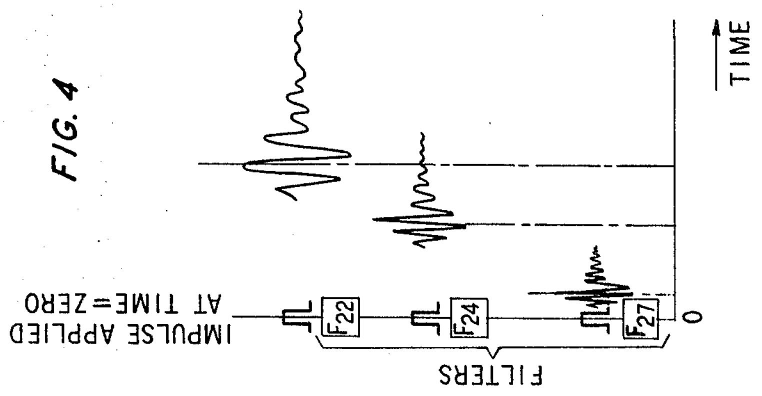

FIG. 4 is a waveform diagram depicting schematically the differing impulse response vs. time of representative filters of the input filter bank 22—27. If at time zero, an impulse is applied to each of filters 22, 24 and 27, their respective responses are delayed by amounts that get greater with decreasing passband center frequency. Delay circuits 28—33 produce delays sufficient to render the response peaks coincident in time, as depicted in FIG. 5. The center-clipping function is demonstrated in FIG. 6 where, using the transfer function of FIG. 3, the main lobes (unshaded) of the impulse response are passed unattenuated, while the center region (shaded) is blocked.

Figure 6:
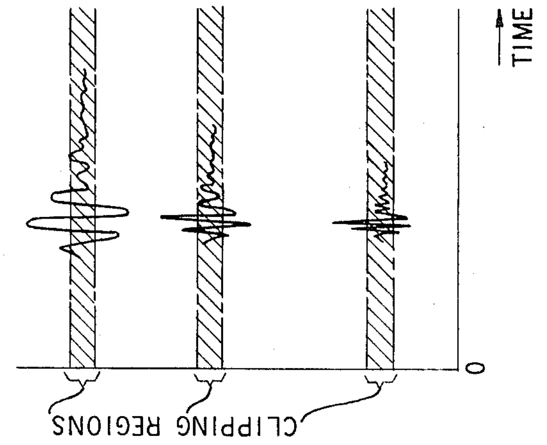

In addition to demonstrating the general function of center clipping, FIG. 6 also illustrates the reduction of filter ringing for the process when used for ringing reduction. The output filter is generally of wider bandwidth than the corresponding input filter.

ECHO REDUCTION

Figure 7:
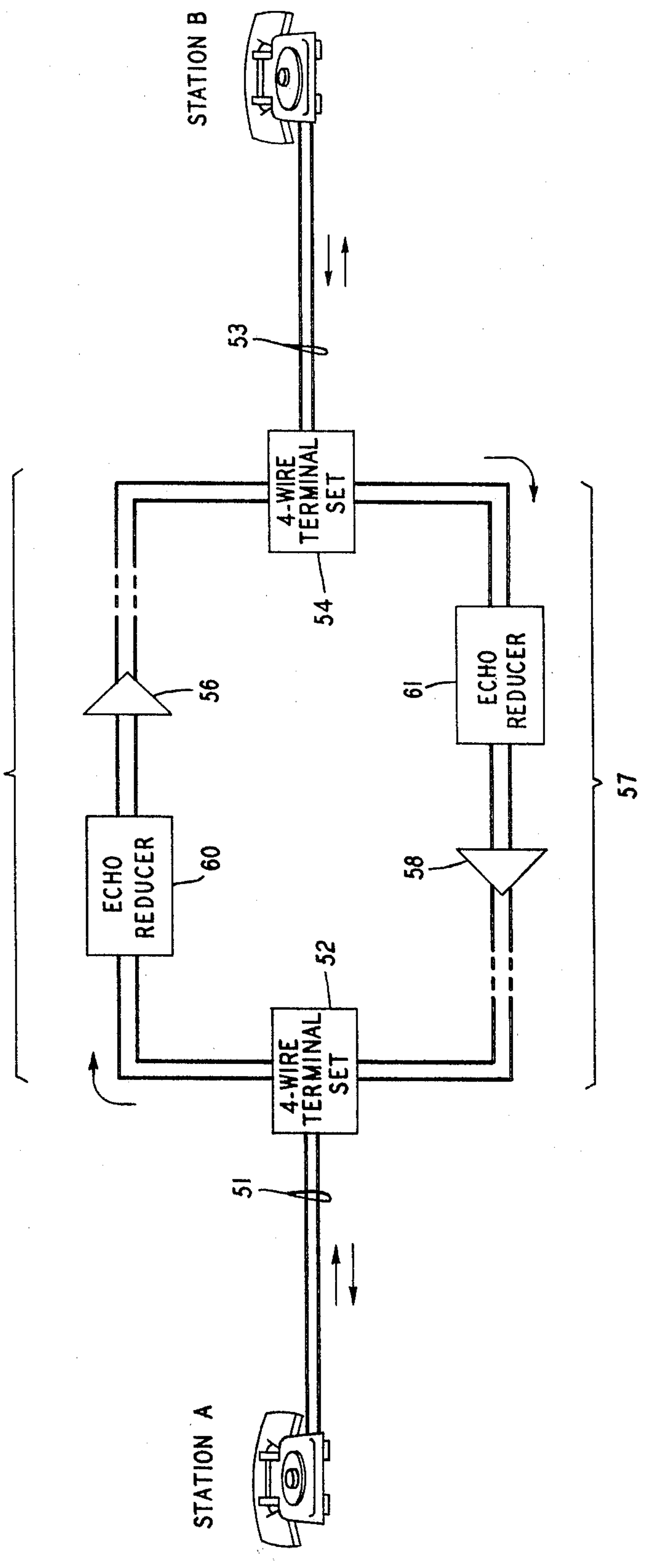
FIG. 7 is a schematic block diagram illustrating the invention's use as an echo suppressor in a telephone link.

As applied to the reduction of echo, the invention is situated as shown in FIG. 7. As in FIG. 1A, stations A and B are connected by a telephone link that now includes a relatively long transmission path in part over a four-wire system. Accordingly, station A is connected by conductor pair 51 to four-wire terminal set 52; and station B is connected by conductor pair 53, to four-wire terminal set 54. Sets 52 and 54 are hybrid networks which decouple the station A transmission path 55 through amplifier(s) 56 from station B transmission path 57 through amplifier(s) 58.

Due to imperfect impedance matches in terminal set 52, a signal from transmission path 57 is carried through set 52 and into path 55. Similarly, a signal from transmission path 55 is carried through set 54 and into path 57.

Pursuant to the invention, a circuit identical in substance to circuit 18 described above, is incorporated in the transmission path 55 as element 60; and in the transmission path 57 as element 61. Elements 60 and 61 act as echo reducers in that the clipping levels of the circuit 18 are set just above the level of the echo signal experienced.

In order for the invention to be effective in this application, the echo signal-level reading at, for example, echo reducer 61 from set 54, must be sufficiently low with respect to transmission signals in the same path from station B. A difference of the order −30 db. is appropriate.

The system shown in FIG. 7 for reduction of echoes can, of course, also include reverberation reduction as taught above, In such case, the circuit 18 is connected as in FIG. 1A at the station sets A and B.

It is to be understood that the embodiments described herein are merely illustrative of the principles of the invention. Various modifications may be made thereto by persons skilled in the art without departing from the spirit and scope of the invention.

What I claim is:

1. Apparatus for processing speech signals in a telephonic voice communications channel containing reverberant speech energy, comprising:

a first bank of filters disposed in the path of transmission and being substantially contiguous in band and occupying a frequency range substantially the bandwidth of said channel;

means for individually center clipping the outputs of the respective filters within a region substantially embracing the peak amplitudes of said reverberant speech energy;

means for continuously summing the outputs of said center-clipping means; and means for transmitting the resulting sum to a user point.

2. Apparatus in accordance with claim 1 further comprising a second bank of filters connected to respective ones of the center-clipper outputs, the band of each said filter having frequencies common with the band of the filter on the input side of the respective center clipper.

3. Apparatus in accordance with claim 2, wherein the passband widths of the respective filters in said second bank are substantially congruent to the passband widths of the filters in said first bank.

4. Apparatus in accordance with claim 3, wherein the filter passbands of said first bank are substantially two-thirds octave wide.

5. Apparatus in accordance with claim 2, further comprising means for delaying the output of each filter in said first bank sufficiently to render the response peaks of all substantially time-coincident.

6. Apparatus in accordance with claim 5, wherein the transfer function of each said center-clipping means is in accordance with that depicted in FIG. 3.

7. In a a telephonic-voice-communications link including a station at which speech is originated in a reverberative enclosure, apparatus for reducing the transmitted reverberative energy comprising:

a first bank of filters connected in the transmission path of said station, the filters being substantially contiguous in band and occupying a frequency range corresponding to the bandwidth of said link;

means for center clipping each of the outputs of the respective filters within a region substantially embracing the peak amplitudes of said reverberative energy;

means for continuously summing the outputs of said center-clipping means, and means for transmitting the resultant sum over said link to a remote station.

8. Apparatus in accordance with claim 7, further comprising a second bank of filters, each connected to respective ones of the center-clipper outputs for removing clipping-distortion products which fall outside of the passband of the corresponding first filter.

9. Apparatus in accordance with claim 8, wherein the passband widths of the respective filters in said second bank are congruent to the passband widths of the filters in said first bank.

10. Apparatus in accordance with claim 9, wherein the filter passbands of said first bank are substantially two-thirds octave wide.

11. Apparatus in accordance with claim 8, further comprising means for delaying the output of each filter in said first bank sufficiently to render the response peaks of all substantially time-coincident.

12. Apparatus in accordance with claim 11, wherein the transfer function of each said center-clipping means is in accordance with that depicted in FIG. 3.

13. In a telephone voice communications link between relatively remote stations and including an electrical circuit echo characteristic, apparatus for reducing the power level of said echo, comprising:

a first bank of filters disposed in the path of transmission and being substantially contiguous in band and occupying a frequency range substantially the bandwidth of said channel;

means for individually center clipping the outputs of the respective filters within a region substantially embracing the peak amplitudes of said echo;

means for continuously summing the outputs of said center-clipping means; and means for transmitting the resulting sum to a user point.

14. Apparatus in accordance with claim 13, further comprising a second bank of filters, each connected to respective ones of the center-clipper outputs for removing clipping-distortion products which fall outside of the passband of the corresponding first filter.

15. Apparatus for processing speech signals in a telephone voice communications channel containing reverberant or circuit-echo-speech energy, comprising a first bank of filters disposed in the path of transmission and having passbands substantially two-thirds octave wide beginning at a low-pass point of approximately 250 Hz.;

means for delaying the output of each filter in said first bank sufficiently to render the response peaks of all substantially time-coincident;

means for individually center clipping the outputs of the respective filters at a point about one-tenth the level of average peak amplitude exhibited in the respective band;

a second bank of filters, each connected to a respective one of the center-clipper outputs, and having passbands substantially congruent to the filters of said first filter bank;

means for continuously summing the outputs of said second bank of filters; and means for transmitting the resulting sum to a user point.